United States Patent
Lubbers et al.

(10) Patent No.: US 8,234,457 B2
(45) Date of Patent: Jul. 31, 2012

(54) DYNAMIC ADAPTIVE FLUSHING OF CACHED DATA

(75) Inventors: Clark E. Lubbers, Colorado Springs, CO (US); Michael D. Walker, Colorado Springs, CO (US); David P. DeCenzo, Pueblo, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/480,128

(22) Filed: Jun. 30, 2006

(65) Prior Publication Data

US 2008/0005478 A1    Jan. 3, 2008

(51) Int. Cl.
*G06F 12/00* (2006.01)
*G06F 12/12* (2006.01)

(52) U.S. Cl. ......... 711/143; 711/113; 711/112; 711/114

(58) Field of Classification Search .................. 711/118, 711/141, 143, 145, 135, 113, 112, 114; 707/201, 707/204; 709/231, 232
See application file for complete search history.

(56) References Cited

U.S. PATENT DOCUMENTS

| | | | | |
|---|---|---|---|---|
| 5,257,352 A | | 10/1993 | Yamamoto et al. | 711/136 |
| 5,581,729 A | * | 12/1996 | Nishtala et al. | 711/143 |
| 5,829,018 A | | 10/1998 | Moertl et al. | 711/113 |
| 5,875,455 A | | 2/1999 | Ito | 711/113 |
| 5,926,834 A | * | 7/1999 | Carlson et al. | 711/152 |
| 6,057,789 A | * | 5/2000 | Lin | 341/61 |
| 6,189,080 B1 | * | 2/2001 | Ofer | 711/167 |
| 6,272,600 B1 | * | 8/2001 | Talbot et al. | 711/140 |
| 6,552,923 B2 | * | 4/2003 | Houston | 365/154 |
| 6,567,888 B2 | | 5/2003 | Kedem | 711/113 |
| 6,629,211 B2 | | 9/2003 | McKnight et al. | 711/141 |
| 6,671,766 B1 | | 12/2003 | Vandenbergh et al. | 711/160 |
| 6,738,865 B1 | | 5/2004 | Burton et al. | 711/133 |
| 6,789,163 B2 | | 9/2004 | Fox et al. | 711/112 |
| 6,868,439 B2 | | 3/2005 | Basu et al. | 709/213 |
| 6,928,518 B2 | | 8/2005 | Talagala | 711/135 |
| 6,978,325 B2 | | 12/2005 | Gibble et al. | 710/33 |
| 7,028,297 B2 | | 4/2006 | Horn et al. | 718/100 |
| 7,171,516 B2 | * | 1/2007 | Lowe et al. | 711/113 |
| 7,734,854 B2 | * | 6/2010 | Adar et al. | 710/113 |
| 2002/0078303 A1 | | 6/2002 | Rozario et al. | 711/133 |
| 2004/0019740 A1 | * | 1/2004 | Nakayama et al. | 711/113 |
| 2004/0024971 A1 | | 2/2004 | Bogin et al. | 711/135 |
| 2004/0205297 A1 | | 10/2004 | Bearden | 711/133 |
| 2005/0182906 A1 | * | 8/2005 | Chatterjee et al. | 711/135 |
| 2006/0143407 A1 | * | 6/2006 | Humlicek | 711/143 |
| 2006/0248308 A1 | * | 11/2006 | Wang et al. | 711/173 |

\* cited by examiner

*Primary Examiner* — Sanjiv Shah
*Assistant Examiner* — Samuel Dillon
(74) *Attorney, Agent, or Firm* — Hall Estill Attorneys at Law

(57) ABSTRACT

Method and apparatus for flushing cached writeback data to a storage array. Sets of writeback data are accumulated in a cache memory in an array with a view toward maintaining a substantially uniform distribution of the data across different locations of the storage array. The arrayed sets of data are thereafter transferred from the cache memory to the storage array substantially at a rate at which additional sets of writeback data are provided to the cache memory by a host. Each set of writeback data preferably comprises a plurality of contiguous data blocks, and are preferably written (flushed) to the storage in conjunction with the operation of a separate access command within a selected proximity range of the data with respect to the storage array. A stripe data descriptor (SDD) is preferably maintained for each set of writeback data in the array.

21 Claims, 4 Drawing Sheets

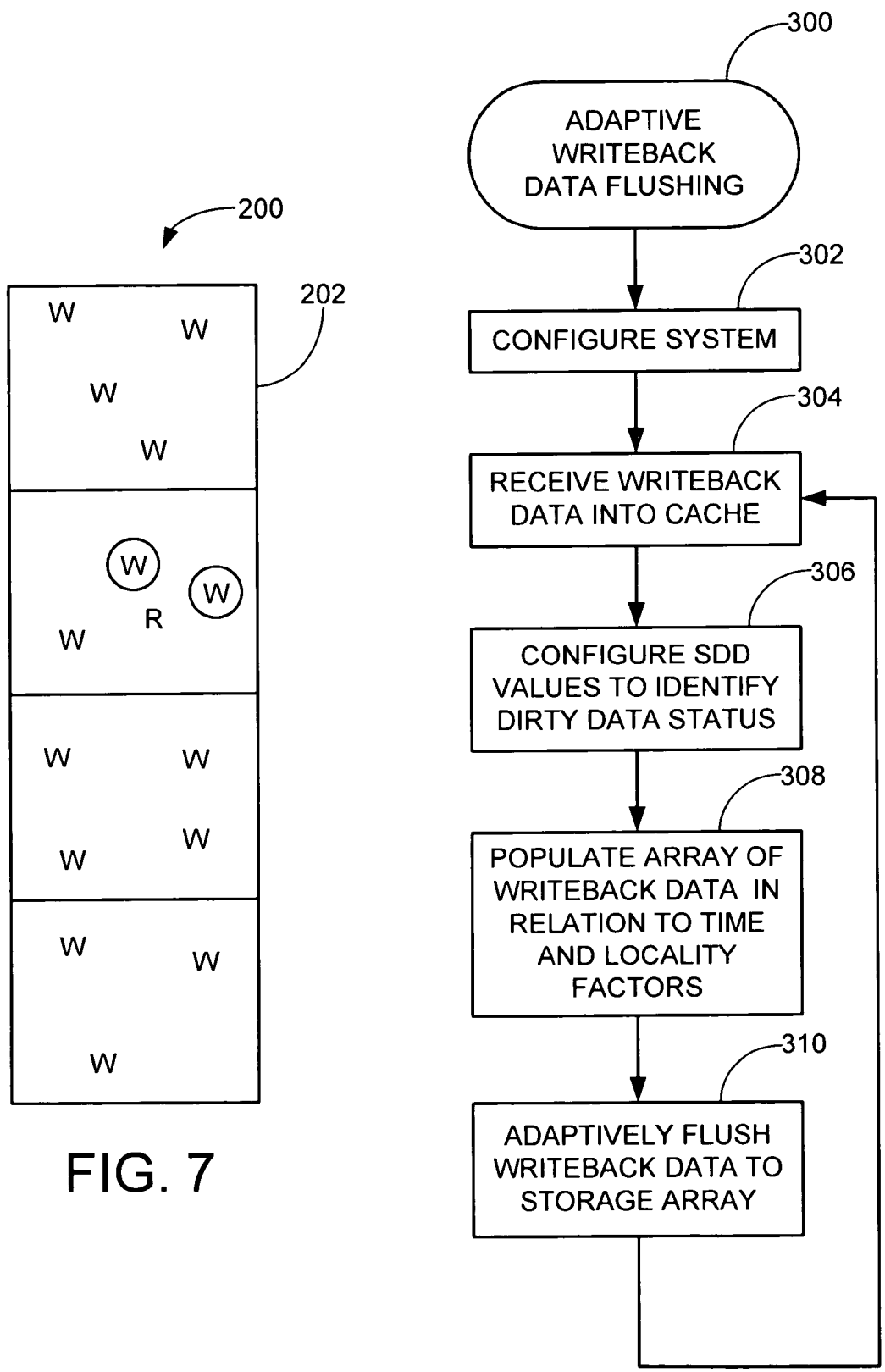

DYNAMIC ADAPTIVE FLUSHING OF CACHED DATA

FIELD OF THE INVENTION

The claimed invention relates generally to the field of data storage systems and more particularly, but not by way of limitation, to a method and apparatus directed to the dynamic adaptive flushing of cached data to a storage array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for flushing cached writeback data to a storage array.

In accordance with preferred embodiments, sets of writeback data are accumulated in a cache memory in an array with a view toward maintaining a substantially uniform distribution of the data across different locations of the storage array. The arrayed sets of data are thereafter transferred from the cache memory to the storage array substantially at a rate at which additional sets of writeback data are provided to the cache memory by a host.

Each set of writeback data preferably comprises a plurality of contiguous data blocks, and are preferably written (flushed) to the storage in conjunction with the operation of a separate access command within a selected proximity range of the data with respect to the storage array. A stripe data descriptor (SDD) is preferably maintained for each set of writeback data in the array.

In this way, the flushing of cached writeback data does not induce significant variations in overall host I/O access rates.

These and various other features and advantages which characterize the claimed invention will become apparent upon reading the following detailed description and upon reviewing the associated drawings.

BRIEF DESCRIPTION OF THE DRAWINGS

FIG. 7 shows a portion of the array of FIG. 6 in accordance with another preferred embodiment.

FIG. 8 is a flow chart for a WRITEBACK DATA FLUSHING routine illustrative of steps carried out in accordance with preferred embodiments.

DETAILED DESCRIPTION

Figure 1:
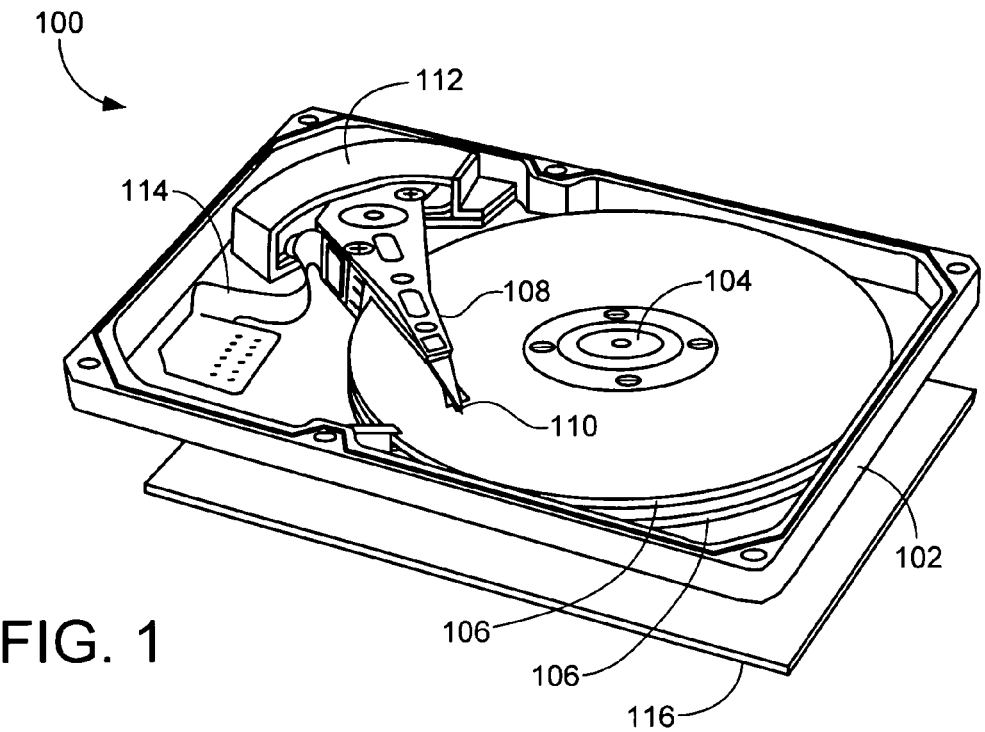
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
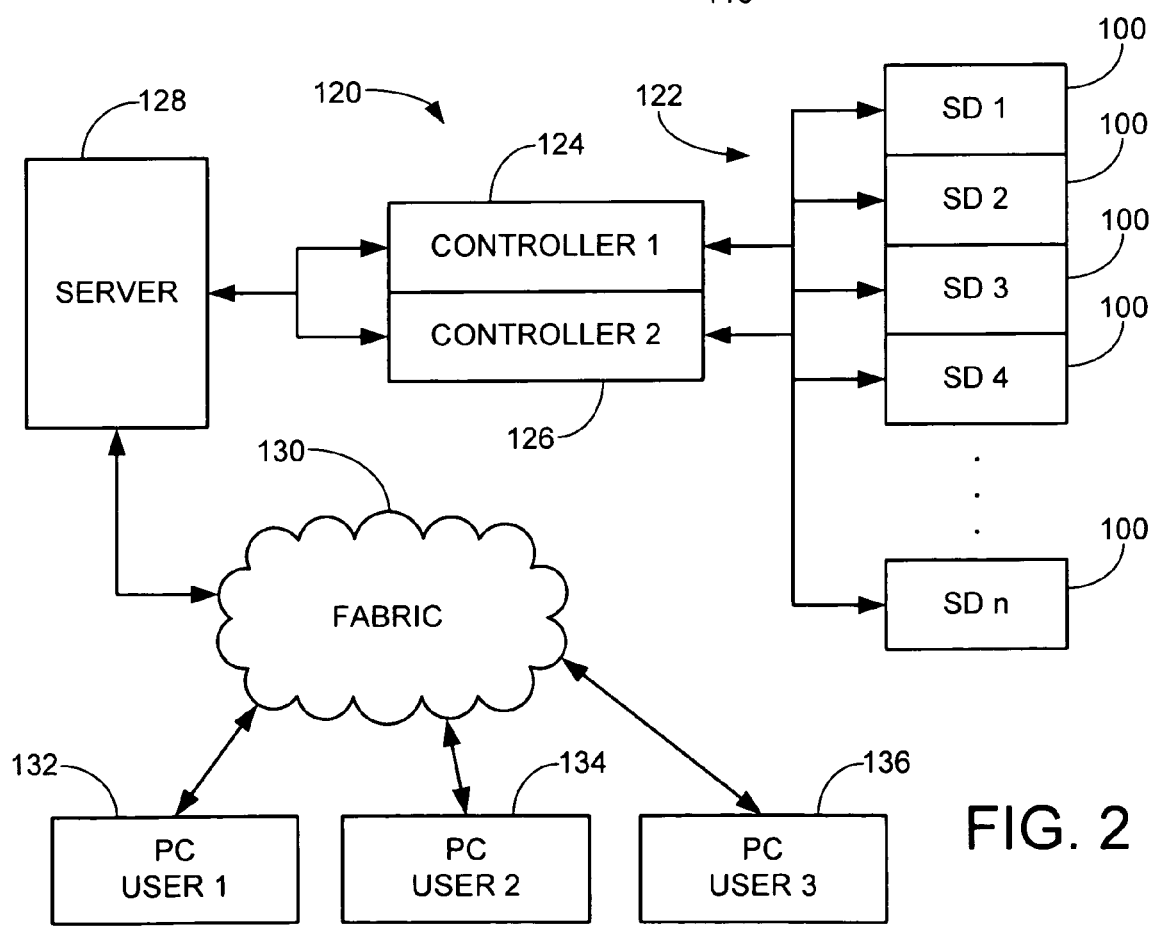
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage array 122. Redundant controllers 124, 126 preferably operate to transfer data between the storage array 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

Figure 3:
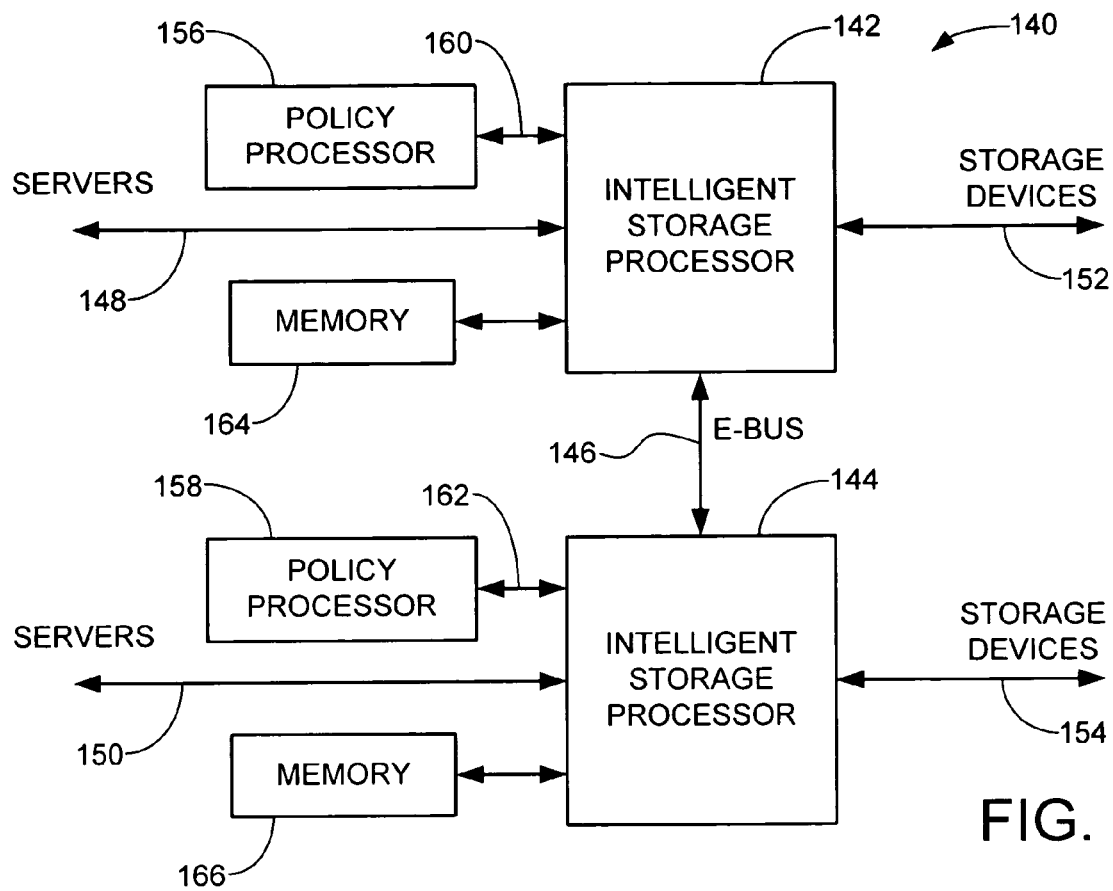
FIG. 3 provides a general representation of a preferred architecture of the controllers of FIG. 2.

The devices 100 and the controllers 124, 126 are preferably incorporated into a multi-device array (MDA). The MDA preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc. FIG. 3 shows an array controller configuration 140 such as useful in the network of FIG. 2.

FIG. 3 sets forth two intelligent storage processors (ISPs) 142, 144 coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (ROTS) for the controller 140 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
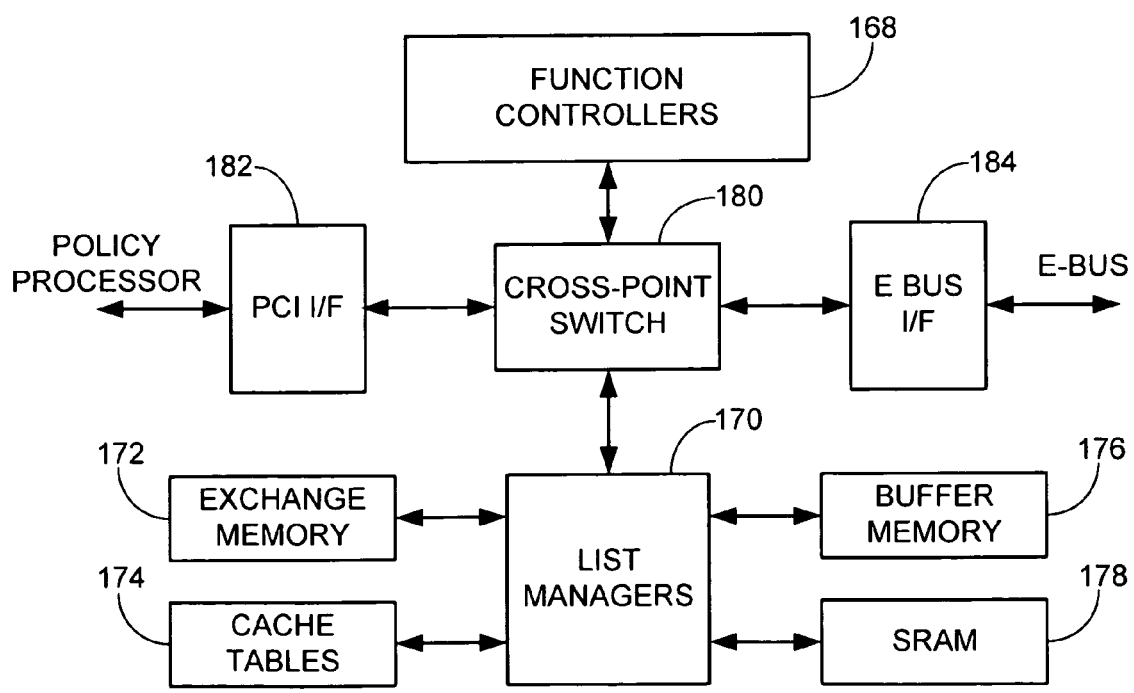
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170 are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a crosspoint switch (CPS) module 180. In this way, a selected function core of controllers 168 can establish a communication pathway through the CPS 180 to a corresponding list manager 170 to communicate a status, access a memory module, or invoke a desired ISP operation.

Similarly, a selected list manager 170 can communicate responses back to the function controllers 168 via the CPS 180. Although not shown, separate data bus connections are preferably established between respective elements of FIG. 4 to accommodate data transfers therebetween. As will be appreciated, other configurations can readily be utilized as desired.

A PCI interface (I/F) module 182 establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

To further enhance processing efficiency, the controller architecture preferably employs a novel writeback data caching methodology. This generally involves the caching of data to be written to the storage devices 100 in memory, and scheduling the transfer of such writeback data to the storage devices 100 (flushing) at a later time.

Generally, sets of contiguous blocks of writeback data are arrayed in cache memory using a two dimensional approach that takes into account both time and locality of the data. A substantially uniform distribution of the cached writeback data is maintained to provide optimum opportunities to write data in conjunction with other access operations.

Preferably, sets of contiguous blocks of data are written from the cache memory to the storage array at a rate that substantially matches a rate at which additional writeback data sets are provided to the cache memory by the host. In this way, large variations in observed host I/O transfer rates are substantially eliminated.

Figure 5:
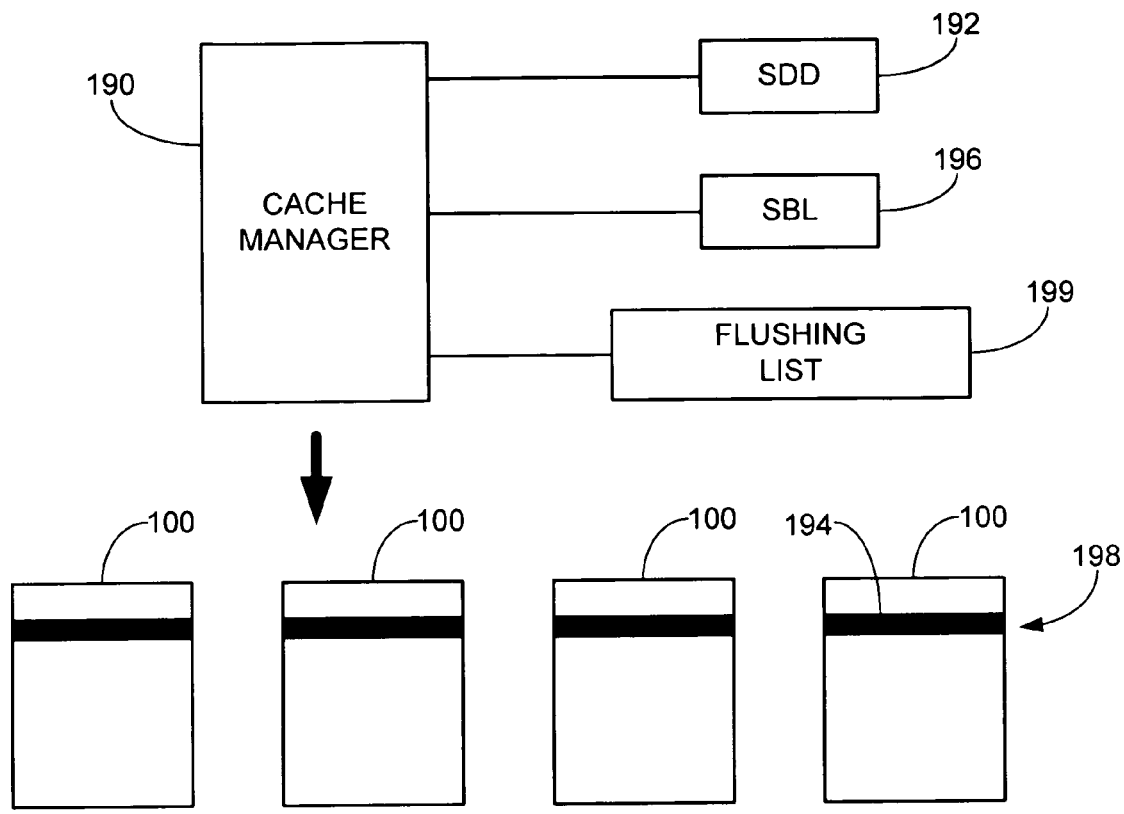
FIG. 5 generally illustrates a cache manager which operates to flush data to the storage array in accordance with preferred embodiments.

As shown in FIG. 5, the cached data are preferably managed on a node basis by a cache manager (CM) 190 using a data structure referred to as a stripe data descriptor (SDD) 192. Each SDD holds data concerning recent and current accesses to the data with which it is associated. Each SDD preferably aligns to a corresponding RAID stripe 194 (i.e., all of the data on a selected device 100 associated with a particular parity set), and conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list.

Preferably, the VBA values are aligned with the RAID data organization using a grid system sometimes referred to as a RAID Allocation Grid System (RAGS). Generally, any particular collection of blocks belonging to the same RAID strip 198 (e.g., all of the data contributing to a particular parity set) will be assigned to a particular reliable storage unit (RSU) on a particular sheet.

A book consists of a number of sheets and is constructed from multiple contiguous sets of blocks from different devices 100. Based on the actual sheet and VBA, the books can be further sub-divided into zones, indicating the particular device or device set (when redundancy is employed).

Each SDD preferably includes variables that indicate various states of the data, including access history, locked status, last offset, last block, timestamp data (time of day, TOD), identifiers to which zone (book) the data belong, and RAID level employed. Preferably, writeback ("dirty" data) status of the data associated with the SDD is managed in relation to dirty data, dirty buffer, dirty LRU and flushing LRU values.

Preferably, the CM 190 concurrently operates to manage the writeback data processes at a number of different levels, depending on system requirements. A first level generally involves the periodic flushing of full SDD structures when a full RAID strip 198 is detected. This can be readily carried out for a given SDD 192 based on the RAID level variable when the SDD identifies the associated data as dirty. Preferably, this involves a backward inspection to determine if enough consecutive adjacent SDD structures are sufficiently full of dirty data. If so, these SDD structures are placed on a flushing list (denoted at 199) and a request is made to commence flushing of the data. Flushing list status can be set using the flushing LRU value of the SDD 192.

Flushing smaller sets of data are preferably handled on an SDD basis. Any SDD with dirty blocks and no locked blocks are preferably set as dirty LRU and sorted by age (e.g., time the data has spent in the cache waiting flushing). Once a particular aging is reached, the flushing LRU variable is preferably set and the flushing list 199 is updated.

Preferably, the aggressiveness of the flushing of data from the flushing list is adaptively adjusted to push out dirty data at substantially the rate that additional dirty data comes into the cache. When a particular range of consecutive dirty blocks is scheduled for flushing, the CM 190 will preferably locate other ranges of dirty blocks based on the RAID level that have proximate locality; that is, blocks that are "nearby" such as in terms of seeking time or that involve access to the same RAID parity strip 199.

Figure 6:
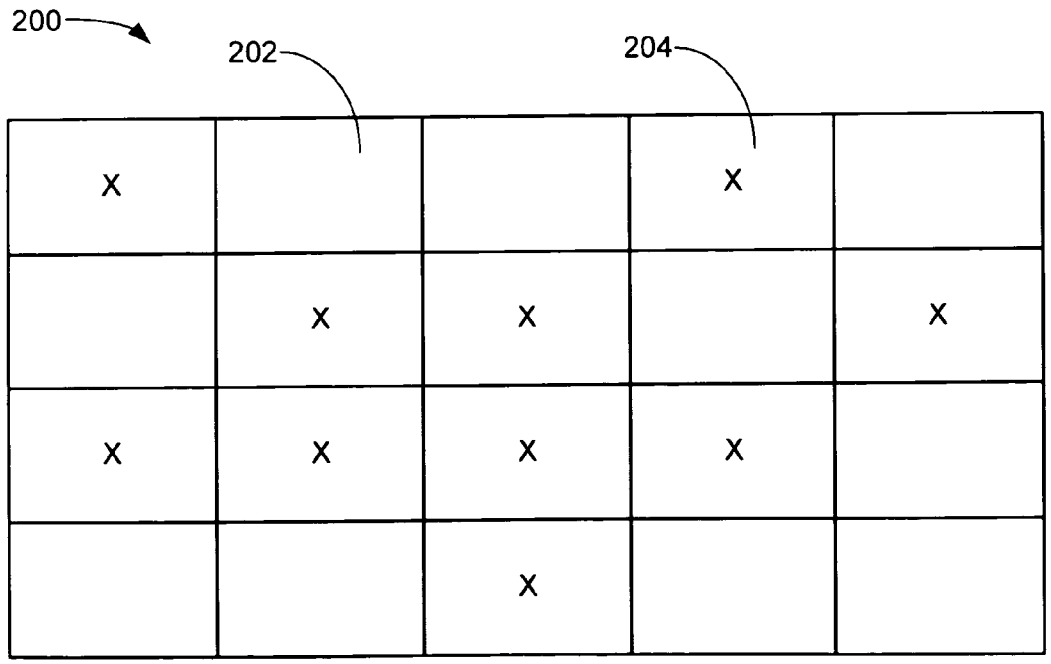
FIG. 6 represents an array of sets of writeback data maintained by the cache manager of FIG. 5 in accordance with preferred embodiments to provide a distribution of writeback data opportunities across a number of different locations of the storage array.

A preferred manner in which the controller architecture carries this out can be viewed with reference to FIG. 6, which represents an array 200 of cached writeback data. The array 200 is maintained by the CM 190 or other processing block of the controller.

Each cell 202 in the array 200 generally corresponds to a selected locality within the storage devices 100, and can be organized as books, sheets and/or zones within the array. Boundaries within the devices can be selected so that, for example, each column represents a different storage device 100 and each cell in a column represents different radial bands across that device.

The cells are "populated" with sets of contiguous writeback data that have been flagged to the flushing list 199. More specifically, each populated block 204 (denoted by an "X" in FIG. 6) represents one (or more) groups of data blocks of varying size corresponding to a different logical or physical location within the storage devices 100. In this way, sets of the writeback data in the cache can be pooled in anticipation of transfer to the storage array 122.

The array 200 provides a useful format for scheduling the writeback of data across the various data devices 100. In a preferred embodiment, when a particular access command is scheduled to access a selected location within the storage devices 100 (such as to carry out a read command), the array 200 is referenced to identify available blocks of writeback data that can be efficiently serviced in conjunction with the access command.

Dirty sets are selectively added to the array 200 in an effort to maintain a substantially uniform distribution of populated cells 204 across the array 200, and to match the rate of incoming dirty data to cache. Under certain system loads, the CM 190 can be configured to load up a relatively large number of flushing operations to create clusters of short seeks, such as writes that progress across logical sets or physical media from ID to OD.

In a related embodiment, the array 200 of FIG. 6 can be configured to arrange the cells 202 to represent individual RAID stripes (such as 194 in FIG. 5 with a corresponding SDD 192), and the columns of the array 200 can correspond to columns of the aforementioned RAGS grid. In such case, the flushing of a particular populated cell 204 in a given row can be used to indicate reference to a parity (not shown in the grid) that is used by other populated cells in that same row.

Scheduling such flushing operations at the same time may lead to performance improvements, particularly in RAID-5 and RAID-6 environments, since two of the four (or six in the case of RAID-6) I/O accesses for all of the populated cells in that row will access the same parity RAID stripe 194.

In another preferred embodiment, the array 200 is arranged so that each column (or row) represents a separate storage device 100, and each cell 202 generally corresponds to different adjacent zones, or regions, across the radial width of the media 106 of the device. One such column formatted in this manner is generally represented in FIG. 7.

The "W" notations in FIG. 7 generally correspond to pending writeback sets of data within these various locations, and thus represent write opportunities that are distributed across the device within each cell 202. The spatial locations of the W notations within each cell 202 generally represents the logical or physical location of that data in the associated region. The W notations do not necessarily represent all of the writeback data sets that are available from the flushing list 199 to write to the media 106.

In a read priority environment, read commands will have priority, and hence will generally be serviced prior to the servicing of write commands. However, in a write dominated environment, generally there will be a relatively larger number of write commands as compared to reads. One such read command is identified by the "R" notation in FIG. 7, and corresponds generally to the region of the media 106 from which the associated data are to be retrieved.

In this embodiment, the cache manager 190 preferably directs the device 100 to carry out the associated read command to retrieve the data at the R notation. At the conclusion of this read operation, the cache manager 190 further preferably proceeds to have the device 100 proceed to perform one or more writeback operations that are in the general proximity of the read command (e.g., in the same cell 202).

FIG. 7 identifies two such writeback data sets that are serviced in this manner using a "circle-W" notation; that is, the two circle-W notation writeback flushes occur at the conclusion of the associated read command (R notation). It is not required, or even necessarily desirable, that all of the writeback data near the read command (e.g., in the cell 202) be flushed. However, at least some of the nearby data will be flushed and, since the transducer(s) 110 of the device 100 are in this general vicinity, these writeback data flushing operations can be carried out with reduced seek latencies.

Once the selected writeback data are flushed, the cache manager 190 proceeds to "backfill" the array 200 with additional writeback data sets to this same region, as such are available from the flushing list. In this way, new write commands are metered to the array 200 to substantially maintain a uniform distribution of writeback data opportunities across the various radial width of the media 106.

As long as there are no pending read commands that require disc access, the cache manager 190 generally operates to flush writeback data as before. However, as each new read command is issued, priority is given to the read command and one or more additional writeback sets are flushed from the general proximity of the read command.

This preferably provides an environment wherein, no matter where the next read command is directed, there may be one or more writeback data sets in proximity thereto that can be flushed in an efficient manner. In a preferred embodiment, the cache manager 190 operates to maintain a selected ratio of "Ws" to "Rs" in the array 200 for each device 100, such as no more than 30 Ws and no more than two Rs pending at any given time (for a total of 32 "slots" for queued commands). Other ratios can readily be used, however. The ratios can also be adjusted over time in relation to burst changes in the read/write command mix experienced by the cache manager 190.

FIG. 8 sets forth a WRITEBACK DATA FLUSHING routine 300, generally representative of steps carried out in accordance with preferred embodiments of the present invention.

The system is initially configured at step 302. Preferably, this will include initial identification of the various boundaries for the flushing list(s) 199 and corresponding array(s) 200 to cover the physical domain of the storage devices 100. As desired, different arrays and lists can be maintained for appropriate subsets of the storage space, or a single, consolidated list/array can be maintained.

Normal system operation next commences, and this includes the periodic provision of writeback (dirty) data to cache memory as shown at step 304. It is contemplated that such writeback data will primarily arise from data write operations from a host such as PCs 132, 134, 136 in FIG. 1, in which case the controller 124 will preferably store the writeback data in a selected cache location (such as 176 in FIG. 4) and provide a write complete signal back to the initiating device. However, the writeback data can alternatively comprise internally generated writes such as system status data, selected memory backups, metadata, etc.

An SDD 192 will preferably be updated for the associated writeback data as shown by step 306. The dirty data and dirty buffers values may initially be set to identify the data as dirty. The data set will subsequently be moved to the flushing list 199 in relation to a number of factors as discussed above including relation of the data to a full strip 198, aging, and rate of ingress of additional data into cache. The array 200 is correspondingly populated at step 308 to identify sets of contiguous data blocks available for flushing in response to movement of said blocks to the flushing list 199.

At step 310, selected sets of the writeback data are flushed to the storage devices 100. This preferably occurs in conjunction with other proximate access operations, although larger sequential flushing operations can also be scheduled across the devices 100. As discussed above, the CM 190 or other process will preferably operate to maintain a substantially uniform distribution of the available writeback data blocks in relation to the rate at which further cached writeback data are introduced to the cache memory.

The various preferred embodiments discussed herein provide advantages over the prior art. The disclosed methodology is dynamic in that both time and locality are factored in to the flushing algorithm to provide the efficient flushing of data to the storage devices 100. The methodology is further adaptive to substantially match the rate at which additional dirty data are introduced to the cache memory. In a preferred embodiment, the sets of dirty data in cache memory will be selectively metered to the array 200 and from the array 200 to the storage discs 100 to maintain a substantially level loading. In this way, significant variations in host I/O rates are avoided.

While preferred embodiments presented herein have been directed to a multi-device array utilizing a plurality of disc drive storage devices, it will be appreciated that such is merely for purposes of illustration and is not limiting. Rather, the claimed invention can be utilized in any number of various environments to promote efficient data handling.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising a storage array, a cache memory coupled to a host device, and first means for establishing a flushing list in the cache memory which respectively associates a predetermined maximum number of sets of writeback data in the cache memory to each of a plurality of locations in the storage array, for executing a read command from the host device to transfer a readback data set from a selected location of the storage array in conjunction with execution of at least one pending write command to transfer an associated writeback data set to the selected location in relation to a monitored rate at which additional sets of writeback data sets are transferred to the cache memory from the host device, for backfilling the flushing list to associate at least one of the additional sets of writeback data with the selected location to maintain said predetermined maximum number of writeback data sets for said selected location, and for adjusting the predetermined maximum number of writeback data sets for said selected location over time in relation to burst changes in a read/write command mix experienced by the first means.

2. The apparatus of claim 1, wherein the first means comprises a cache manager.

3. The apparatus of claim 1, wherein the storage array comprises a transducer configured to be moved to a selected location adjacent a recording medium to service a selected access command, and wherein the first means transfers a selected set of writeback data from the cache memory to the medium in relation to a proximity between the selected location of the selected access command and the associated location for the selected set of writeback data.

4. The apparatus of claim 3, wherein said proximity comprises a selected seek length of the transducer.

5. The apparatus of claim 1, wherein the first means further transfers said sets of writeback data to maintain a selected distribution of the writeback data across the array in relation to said locations of the storage array.

6. The apparatus of claim 1, wherein the storage array comprises a plurality of data storage devices, and wherein each location comprises a different one of said data storage devices.

7. The apparatus of claim 1, wherein the first means operates to eliminate relatively large variations in overall data transfer rates between the memory storage space and said host device.

8. A method comprising:
   populating a flushing list in a cache memory so that, for each location of a plurality of locations of a storage space, a predetermined maximum non-zero number of accumulated writeback data sets in the cache memory are associated with each said location;
   executing a read command from a host device to transfer data from a selected location of the storage space to the cache memory in conjunction with a transfer of at least one of the accumulated writeback data sets associated with the selected location from the cache memory to the selected location in relation to a monitored rate at which additional writeback data sets are provided to the cache memory;
   updating the list to associate at least one additional accumulated writeback data set with the selected location up to said maximum predetermined number of accumulated writeback data sets for the selected location; and
   adjusting the maximum predetermined number of accumulated writeback data sets in the cache memory associated with each said location over time in relation to burst changes in a read/write command mix received from the host device.

9. The method of claim 8, in which the populating step is carried out by a cache manager which populates the list with less than all of the available accumulated writeback data sets received from a host device awaiting transfer to the storage space.

10. The method of claim 8, in which the predetermined number of pending writeback data sets in the flushing list is the same number for all said locations.

11. The method of claim 8, in which the writeback data sets associated with each of the locations in the memory space each comprise a plurality of contiguous data blocks which are transferred to the memory space responsive to the execution of an associated write command.

12. The method of claim 8, in which the executing and updating steps are respectively carried out in turn for each said location responsive to receipt of read commands for each said location.

13. The method of claim 8, in which the flushing list formed in the cache memory comprises a plurality of cells, each cell associated with an adjacent concentric band of a storage surface of the storage space so that, upon execution of a selected pending read command for a selected cell, a selected pending write command of the selected cell is concurrently executed and a new pending write command is associated with the selected cell to replace the selected pending write command.

14. The method of claim 8, wherein the cache memory stores m sets of writeback data, and the populating step comprises arraying n sets of said writeback data associated with different nonadjacent locations of the storage space in preparation for flushing thereto, with n less than m.

15. The method of claim 8, in which the executing and updating steps are further carried out to eliminate substantial variations in overall data transfer rates between the memory storage space and said host device.

16. An apparatus comprising a storage space having a plurality of locations and a controller coupled to the storage space comprising a cache manager adapted to establish a flushing list in a cache memory which respectively associates a predetermined maximum number of accumulated writeback data sets in the cache memory to each respective location of the storage space, the cache manager servicing each of a plurality of received read commands from a host in turn by executing the read command to transfer a readback data set from a selected location of the storage space to the cache memory in conjunction with execution of at least one pending write command to transfer an associated writeback data set from the flushing list to the selected location in relation to a monitored rate at which additional sets of writeback data sets are transferred to the cache memory, the cache manager further adapted to backfill the flushing list to associate at least one of the additional sets of writeback data sets with the selected location to maintain said predetermined maximum number of writeback data sets for said selected location, the cache manager further adapted to adjust the predetermined maximum number of writeback data sets for said selected location in relation to burst changes in a read/write command mix experienced by the cache manager.

17. The apparatus of claim 16, in which the cache manager populates the list so that the predetermined maximum number of pending writeback data sets in the flushing list is the same number for all said locations.

18. The apparatus of claim 16, in which the predetermined number is selected by the cache manager irrespective of a pending number of read and write commands from a host device pending execution to transfer data between the cache memory and the storage space.

19. The apparatus of claim 16, in which the writeback data sets associated with the respective locations each comprise a plurality of contiguous data blocks which are transferred to the memory space responsive to the execution of an associated write command.

20. The apparatus of claim 16, wherein the storage space comprises a plurality of independent data storage devices, and each location comprises a different one of said data storage devices.

21. The apparatus of claim 16, in which the cache manager populates the list with less than all of the available accumulated writeback data sets received from a host device awaiting transfer to the storage space.

* * * * *